(12) United States Patent
Arias-Paic et al.

(10) Patent No.: US 11,478,749 B2
(45) Date of Patent: Oct. 25, 2022

(54) METHOD FOR PURIFYING AND RECOVERING SOLVENT FROM ION EXCHANGE PROCESSES

(71) Applicant: Government of the United States, as Represented by the U.S. Department of the Interior, Bureau of, Washington, DC (US)

(72) Inventors: Miguel Salvador Arias-Paic, Boulder, CO (US); Julie Ann Korak, Louisville, CO (US)

(73) Assignee: U.S. Department of the Interior, Bureau of Reclamation, Washington, DC (US)

( * ) Notice: Subject to any disclaimer, the term of this patent is extended or adjusted under 35 U.S.C. 154(b) by 57 days.

(21) Appl. No.: 16/873,717

(22) Filed: Jun. 11, 2020

(65) Prior Publication Data

US 2020/0398221 A1    Dec. 24, 2020

Related U.S. Application Data

(60) Provisional application No. 62/921,439, filed on Jun. 18, 2019.

(51) Int. Cl.
*B01D 15/20* (2006.01)
*B01D 61/00* (2006.01)
*C02F 1/42* (2006.01)

(52) U.S. Cl.
CPC ......... *B01D 61/005* (2013.01); *B01D 15/203* (2013.01); *B01D 2311/12* (2013.01); *B01D 2311/18* (2013.01); *B01D 2311/25* (2013.01); *B01D 2311/2623* (2013.01); *B01D 2311/2642* (2013.01); *B01D 2311/2649* (2013.01); *C02F 1/42* (2013.01); *C02F 2303/16* (2013.01)

(58) Field of Classification Search
CPC .............. B01D 15/203; B01D 2311/25; B01D 2311/2623; B01D 2311/2649; C02F 1/42
See application file for complete search history.

(56) References Cited

U.S. PATENT DOCUMENTS

| 4,069,119 A | 1/1978 | Wong |
| 4,155,982 A | 5/1979 | Hunkin et al. |

(Continued)

FOREIGN PATENT DOCUMENTS

| WO | WO2002000551 A2 | 1/2002 |
| WO | WO2003053348 A2 | 7/2003 |
| WO | WO2015031112 A1 | 3/2015 |

OTHER PUBLICATIONS

Jensen, V.B. & Darby, J.L. Brine Disposal Options for Small Systems in California's Central Valley. Journal American Water Works Association (2016), 108 (5), 276-289.

(Continued)

*Primary Examiner* — Bradley R Spies
(74) *Attorney, Agent, or Firm* — Joseph Hsiao

(57) ABSTRACT

The invention relates to a system and method of use for concentrating a solution that is eluted from an ion exchange process (elution solution) during an ion exchange regeneration using the osmotic pressure of the salt saturator. This method recovers solvent from the elution solution that could be used in a future ion exchange regeneration process. The concentration of the elution solution may include the precipitation and removal of solids from the elution solution.

13 Claims, 13 Drawing Sheets
(5 of 13 Drawing Sheet(s) Filed in Color)

(56) References Cited

U.S. PATENT DOCUMENTS

| | | | |
|---|---|---|---|
| 4,207,397 A | 6/1980 | Davis et al. |
| 4,235,850 A | 11/1980 | Otto, Jr. |
| 5,002,645 A | 3/1991 | Eastland, Jr. et al. |
| 5,192,418 A | 3/1993 | Hughes et al. |
| 5,254,257 A | 10/1993 | Brigano et al. |
| 5,476,591 A | 12/1995 | Green |
| 6,391,205 B1 | 5/2002 | McGinnis |
| 7,132,052 B2 | 11/2006 | Raswon et al. |
| 7,157,005 B2 | 1/2007 | Jacob, IV et al. |
| 7,540,965 B2 | 1/2009 | Sengupta et al. |
| 7,560,029 B2 | 7/2009 | McGinnis |
| 7,914,680 B2 | 3/2011 | Cath et al. |
| 8,021,549 B2 | 9/2011 | Kirts |
| 8,021,553 B2 | 9/2011 | Iyer |
| 8,029,671 B2 | 10/2011 | Cath et al. |
| 8,585,906 B2 | 11/2013 | Jessen et al. |
| 9,039,899 B2 | 5/2015 | McGinnis |
| 9,044,711 B2 | 6/2015 | McGinnis |
| 9,138,688 B2 | 9/2015 | Prakash et al. |
| 9,180,411 B2 | 9/2015 | Prakash et al. |
| 9,186,665 B2 | 11/2015 | Jessen et al. |
| 9,248,405 B2 | 2/2016 | McGinnis et al. |
| 9,266,065 B2 | 2/2016 | McGinnis et al. |

OTHER PUBLICATIONS

Phuntsho, S. et al. Forward Osmosis Desalination of Brackish Groundwater: Meeting Water Quality Requirements for Fertigation, J. Membr. Sci. (2013), 436:1-15.

Seidel, C. J. et al. National and California Treatment Costs to Comply with Potential Hexavalent Chromium MCLs. J. Am. Water Works Assoc. (2013), 105 (6), 39-40.

Arias-Paic, M.S. & Korak, Julie A. (2020). Forward Osmosis for Ion Exchange Waste Brine Management, Environ. Sci. Technol. Lett. (2020), 7(2), 111-117.

US 11,478,749 B2

METHOD FOR PURIFYING AND RECOVERING SOLVENT FROM ION EXCHANGE PROCESSES

CROSS REFERENCE TO RELATED APPLICATIONS

The present applications claims priority to the earlier filed U.S. provisional application having Ser. No. 62/921,439 filed on Jun. 18, 2019, and hereby incorporates subject matter of the provisional application in its entirety.

STATEMENT OF GOVERNMENT INTEREST

The invention described herein may be manufactured and used by or for the Government of the United States of America, for governmental purposes, without the payment of any royalty thereof or therefor.

FIELD OF THE INVENTION

This invention relates to ion exchange, and more particularly, the process coupled to forward osmosis to concentrate elution solutions through solvent volume reduction, solid products precipitation, and solvent recovery.

BACKGROUND OF THE INVENTION

Ion exchange is a process that is widely used to perform separations of ionized solutes (e.g., anions, cations) in liquid solutions. An example schematic of an ion exchange process for drinking water treatment is shown in FIG. 1. Ion exchange is a process that uses a resin 10 with surface and interstitial functional groups contained in a contactor or vessel 20. Ion exchange resins 10 can also be used as a catalyst in the chemical processing industry. Resins 10 with basic functional groups (e.g., strong base, weak base) are used to exchange negatively charged solutes. Resins 10 with acidic functional groups (e.g., strong acid, weak acid) are used to exchange positively charged solutes. Resins 10 doped with inorganic materials are used to exchange charged solutes and impart adsorption functionalities.

In the example illustrated in FIG. 1, a contactor influent 30, such as groundwater, enters the contactor 20 containing resin 10. The contactor influent 30 can contain a mixture of background solutes 40 and target solutes 50, both of which are charged ions in solution. Target solutes 50 (e.g., nitrate and chromate) are solutes for which the process is designed to remove. Background solutes 40 (e.g., dissolved organic matter or sulfate) are other solutes in the liquid stream that affect the process but are not the primary ions to be separated. As the solution passes through the contactor 20, background solutes 40 and target solutes 50 exchange with counter ions 60 on the resin 10 in a ratio that maintains charge equality. Resin exhaustion is operationally defined when background solutes 40 or target solutes 50 are measured in the contactor effluent 70 at unacceptable concentrations (e.g., near a maximum operational concentration or regulatory threshold).

Ion exchange is used as a separation, purification and catalysis method across many industries, such as drinking water treatment, wastewater treatment, ultrapure water treatment, hydrometallurgy, metal plating industry, pharmaceutical, personal care product, power generation, semiconductors and electronics manufacturing and the food and beverage industry. A non-exclusive list of solutes where ion exchange is applicable include ionic forms of Aluminum, Antimony, Arsenic, Barium, Beryllium, Bismuth, Boron, Calcium, Chromium, Cobalt, Copper, Gold, Iron, Lead, Lithium, Magnesium, Manganese, Mercury, Molybdenum, Nickel, Platinum, Potassium, Radium, Rhenium, Selenium, Sodium, Strontium, Thallium, Uranium, Vanadium, Zinc, Acetate, Ammonium, Bicarbonate, Bisulfate, Bromate, Bromide, Carbonate, Cyanide, Natural Organic Matter, Nitrate, Nitrite, Perchlorate, Pharmaceuticals, Perfluoroalkyl Compounds, Sugars and Sulfate.

A regenerant solution 80 (FIG. 2) may be used to regenerate ion exchange resin 90 or to separate exchanged solutes by chromatography. The regenerant solution 80 is a concentrated solution of a regeneration solute 100 (or solutes). To form a regenerant solution 80, regeneration solvent 120 is added to a saturator vessel 130 containing the regeneration salt 140, the solid form of the regeneration solute 100 to be used for the regeneration process. Salts commonly composed of regeneration solutes 100 include sodium chloride (NaCl), sodium bicarbonate ($NaHCO_3$), sodium carbonate ($Na_2CO_3$), magnesium chloride ($MgCl_2$), potassium chloride (KCl), sodium sulfate ($Na_2SO_4$), ammonium sulfate (($NH_4)_2SO_4$), ammonium chloride ($NH_4Cl$), sodium hydroxide (NaOH), hydrochloric acid (HCl), sulfuric acid ($H_2SO_4$), and phosphoric acid ($H_3PO_4$). Regeneration solvent 120 is added in an amount to produce a saturated salt solution 150. The saturated salt solution 150 is transferred to a dilution tank 160 where it is mixed with additional regeneration solvent 120 to form the regenerant solution 80 with the desired concentration (e.g., 10% w/w solution of NaCl). Once diluted, the regenerant solution 80 is passed through the contactor 170 containing exhausted ion exchange resin 90, and the regeneration solute 100 (e.g., chloride) displaces resin-phase ions 180 producing an elution solution 190. The elution solution 190 contains both displaced resin-phase ions 180 and excess regeneration solutes 100. The elution solution 190 is collected in a collection tank 200 where is it stored until further processing or waste disposal 210.

In many ion exchange applications, there is a need to decrease the volume of the elution solution 190 to improve subsequent processing or reduce the volume requiring disposal. In ion exchange applications where the elution solution 190 is considered a waste product, managing and disposing of this high salinity elution solution 190 (also referred to as a waste brine) determines the economic feasibility of the ion exchange process. Only in select applications can a waste brine be directly discharged to a wastewater treatment plant or a natural water source. Such facilities need to have a direct sewer connection to a wastewater plant, and the discharge of an elution solution 190 with hazardous characteristics may be limited. When facilities have sufficient land and the elution solution 190 is non-hazardous, evaporation ponds may be used as a disposal technique. A limitation, however, is that the solvent (e.g., water), cannot be recovered for future use. Evaporation ponds may not be feasible for elution solutions 190 that contain hazardous substances (e.g., hexavalent chromium, selenium, arsenic, uranium, radium).

For water treatment applications, on-site disposal or discharge are often not available for rural municipal drinking water districts. Instead, the elution solution 190 must be transported to appropriate sites, and the transportation costs can make ion exchange economically unfeasible. For example, ion exchange is one treatment technology capable of removing nitrate from contaminated groundwater, but the elution solution 190 disposal is costly in rural communities without centralized wastewater treatment. For example, a study by Jensen and Darby found that 54-97% of the cost to produce potable water from nitrate-contaminated aquifers is attributed to elution solution 190 transportation costs to disposal sites (Jensen, V. B. & Darby, J. L. (2016) Brine Disposal Options for Small Systems in California's Central Valley. *Journal American Water Works Association.* 108 (5), 276-289).

When the elution solution 190 contains hazardous chemicals (e.g., hexavalent chromium, uranium, arsenic, perchlorate etc.), the costs associated with transportation and disposal increase. Seidel et al. discuss that the EPA is currently reviewing a draft human health assessment for hexavalent chromium in drinking water and will decide if the national standards should be revised. If a maximum contaminant level of 10 μg/L is implemented nationwide, it is estimated that between 1,900 and 8,800 entry points to public water systems in the United States would require additional treatment to meet a new hexavalent chromium standard. The estimated national cost for meeting a maximum contaminant level of 10 μg/L is $550 million to $5.1 billion per year, with waste disposal being a key contributor to cost (Seidel, C. J. et al. (2013). National and California Treatment Costs to Comply with Potential Hexavalent Chromium MCLs. *J. Am. Water Works Assoc.* 105 (6), 320-336). Methods that could economically reduce the volume of elution solution 190 (waste brine) requiring disposal would significantly decrease water treatment costs.

In many applications, the elution solution 190 is not a waste product but a purified product with an economic value. In the metallurgy industry, ion exchange has been used to recover and purify valuable products by concentrating the product (e.g., chromium, copper, zinc, thorium, gold, silver, nickel, and cobalt, etc.) on ion exchange resins before recovering the product in the elution solution 190 after regeneration (U.S. Pat. Nos. 4,155,982; 4,235,850; 5,002,645; 4,069,119; 5,785,736). Once the valuable product is in the elution solution 190, additional processing may be needed and may include chemical additions to promote precipitation reactions, chemical addition to change the solution pH, or solution concentration using energy-intensive evaporation processes. In each of these examples, the post-ion exchange processing could be improved if the elution solution 190 were more concentrated. Chemical quantities could be decreased and any evaporative processes could benefit from decreased energy or equipment requirements. Therefore, low-energy processes that could further concentrate the elution solution 190 and recover the solvent 120 would benefit a wide range of chemical processes.

In some applications, it may be beneficial to selectively precipitate salts from the elution solution 190. Several methods have been developed precipitate salts from the elution solution 190 by adding a chemical and using a solids separation process to remove the solids (U.S. Pat. No. 5,192,418). A disadvantage of these approaches is that chemical addition represents an additional operating cost. Precipitation reactions are more efficient and can occur spontaneously at higher solution concentrations. Methods that concentrate the elution solution 190 could decrease or eliminate the need for a chemical addition to recover salts from ion exchange elution solutions 190.

While each application has specific objectives when managing or processing ion exchange elution solutions, several technologies have been used. For water treatment applications, a common approach is to use combinations of chemical additions and hydraulic pressure-driven filtration processes (e.g., nanofiltration, reverse osmosis) (U.S. Pat. No. 9,186,665). A disadvantage of these approaches is that chemical addition and high-pressure pumping can be a significant process operating costs or infeasible.

Forward osmosis is an osmotic pressure-driven process where water permeates across a semi-permeable membrane from a solution with lower osmotic pressure, known as the feed solution, to a solution with higher osmotic pressure, known as the draw solution, as illustrated in FIG. 3. FIG. 3 is a schematic of the conventional forward osmosis membrane process. The osmotic pressure of both the draw solution 300 and feed solution 310 depend on the composition and concentration of the solution. A housing 320 contains a semi-permeable membrane 330 that separates the feed solution 310 from the draw solution 300. If the osmotic pressure is different between the feed solution 310 and draw solution 300, water permeates across the membrane from the solution with lower osmotic pressure to the solution with higher osmotic pressure. Conventionally, water permeates from the feed solution 310 to the draw solution 300. Forward osmosis produces a diluted draw solution 340 and concentrated feed solution 350. Forward osmosis does not directly produce desalinated water in either draw 300 or feed 310 solutions. Forward osmosis uses membranes 330 similar to high-pressure reverse osmosis membranes that exhibit a high rejection of dissolved solutes. Compared to other processes (e.g., nanofiltration, reverse osmosis, evaporators), forward osmosis is a low-energy process that does not require energy-intensive pumps to deliver high hydraulic pressures or heating systems for thermal evaporation as it harnesses the chemical energy difference between two solutions.

Forward osmosis is used in desalination applications, which require coupling forward osmosis with other energy-intensive draw solution recovery or regeneration processes, such as reverse osmosis, nanofiltration or thermal separation processes to produce low salinity water (U.S. Pat. No. 8,029,671). Forward osmosis is most practical where the diluted draw solution has a direct beneficial use without the need for a recovery or regeneration step. Limited applications exist where the diluted draw solution 340 has a direct use and does not require another recovery or regeneration step, such as osmotic dilution of the influent to a reverse osmosis system, fertigation, or beverage applications (U.S. Pat. No. 8,083,942; WO Application WO2003053348A2; Phuntsho, S. et al. (2013) Forward Osmosis Desalination of Brackish Groundwater: Meeting Water Quality Requirements for Fertigation by Integrating Nanofiltration, *Journal of Membrane Science*, (436), 1-15); however, these configurations have not been widely adopted. Forward osmosis applications that require an additional step to process the draw solution (e.g., reverse osmosis, distillation, thermal draw solute separation) can be energy intensive and require the purchase of additional equipment. For fertigation and beverage applications, the diluted draw solution 340 containing the fertilizer or beverage is often too concentrated to be used directly and requires additional dilution from another water source, reducing the benefits of using forward osmosis. A common limitation of forward osmosis is handling and processing the diluted draw solution 340. The invention presented herein overcomes this limitation by directly using the diluted draw solution 340 without any resource intensive processing.

BRIEF DESCRIPTION OF THE DRAWINGS

The patent or application file contains at least one drawing executed in color. Copies of this patent or patent application publication with color drawings will be provided by the Office upon request and payment of the necessary fee.

The patent or application file contains at least one drawing executed in color. Copies of this patent or patent application publication with color drawings will be provided by the Office upon request and payment of the necessary fee.

SUMMARY OF THE INVENTION

This invention demonstrates how a novel process of coupling forward osmosis with ion exchange can concentrate and recover water from the elution solution for the next regeneration cycle. It is, therefore, a major object of the present invention to provide a process for reducing elution solution volumes. Another object of the invention is to recover the solvent from the elution solution for use in another ion exchange regeneration cycle. Another object of the invention is to concentrate the elution solution to improve the efficiency of subsequent chemical processing. For applications where the elution solution is a waste stream, another object of the invention is to reduce disposal costs by reducing the volume requiring handling, storage, and transportation.

In accordance with the invention, this low-energy treatment process will make treatment of impaired water sources more economical by reducing disposal costs by volume reduction. For example, this invention has demonstrated herein volume reductions from drinking water processes removing nitrate and hexavalent chromium between 60% and 85%. The impact of this invention could be on the order of hundreds of millions of dollars per year of cost savings, particularly in the United States. If a hexavalent chromium maximum contaminant level in drinking water is implemented nationwide, additional treatment costs are expected to exceed $1 billion per year. If 50% of the treatment costs are associated with elution solution (waste) disposal, this invention could directly lead to a cost savings of $425 million per year for chromium treatment alone.

Implementation of this invention would lead to similar cost saving for other ion exchange processes used in many industries.

This invention identifies a new process using forward osmosis. In one embodiment of the invention, the forward osmosis is integrated into an ion exchange process to reduce the volume of the elution solution and recover the solvent for the next regeneration cycle.

Figure 1:
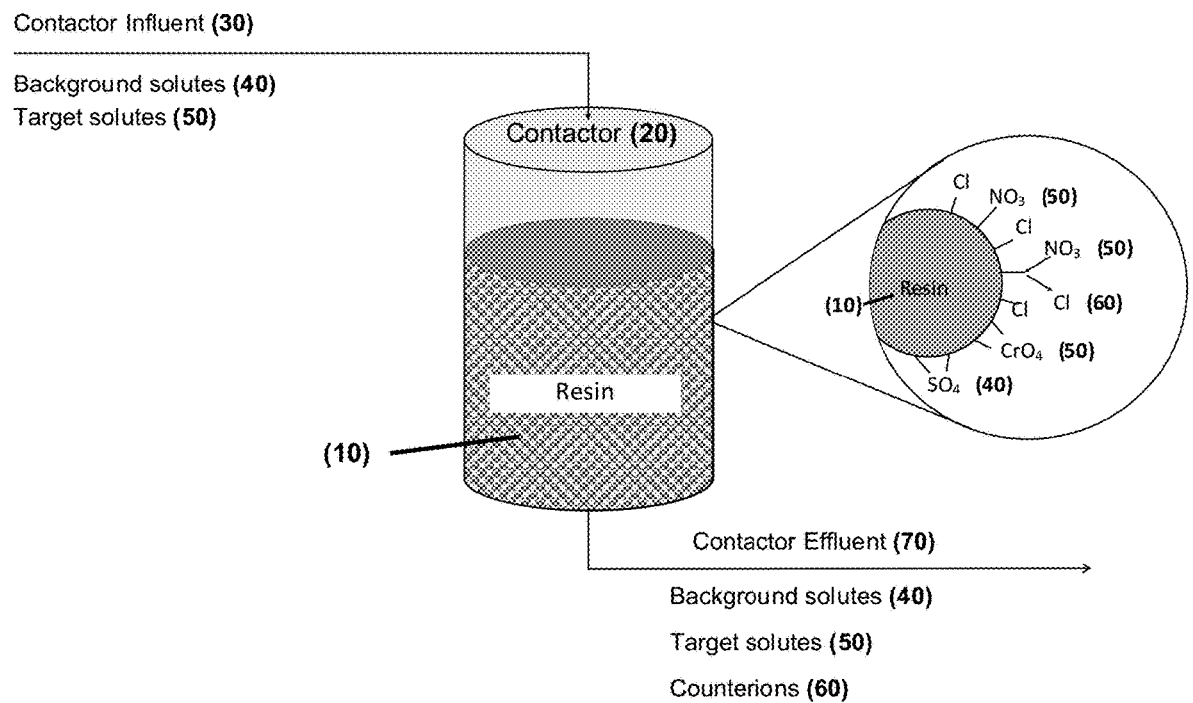
FIG. 1 shows the ion exchange loading process of the prior art.
Figure 2:
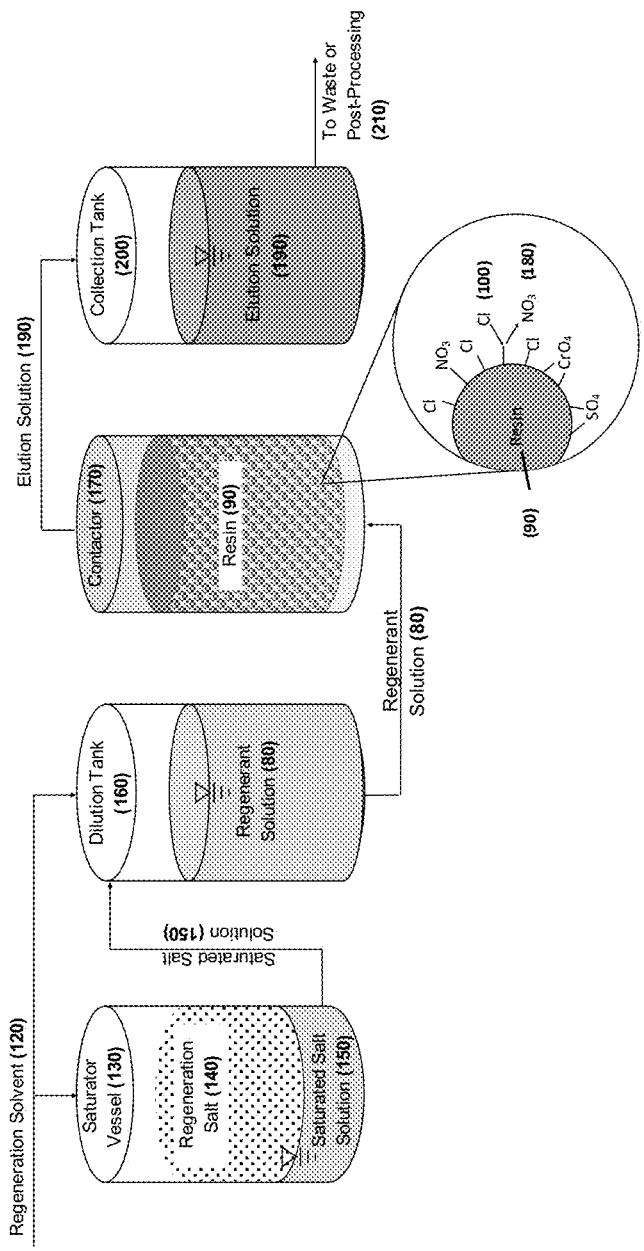
FIG. 2 shows the ion exchange regeneration process of the prior art.
Figure 3:
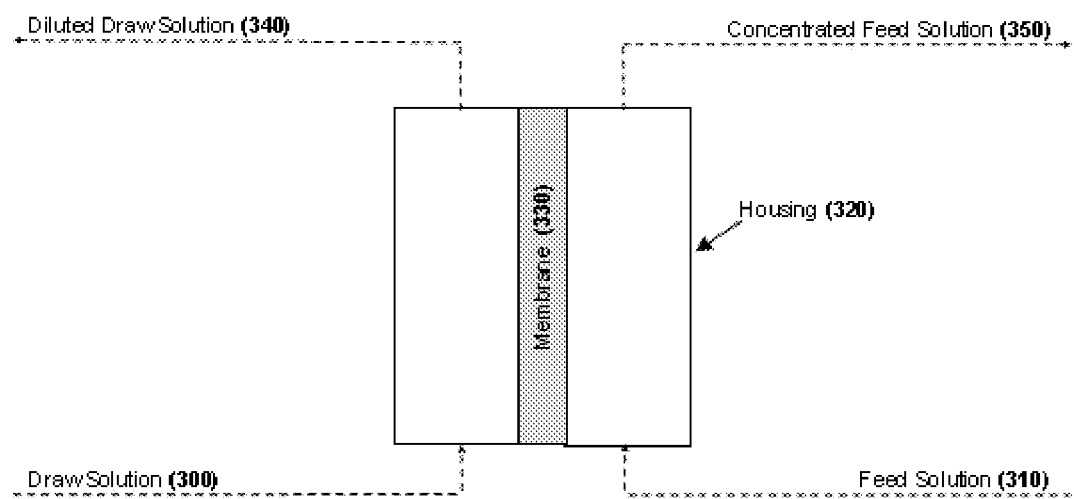
FIG. 3 shows the forward osmosis membrane process of the prior art.
Figure 4:
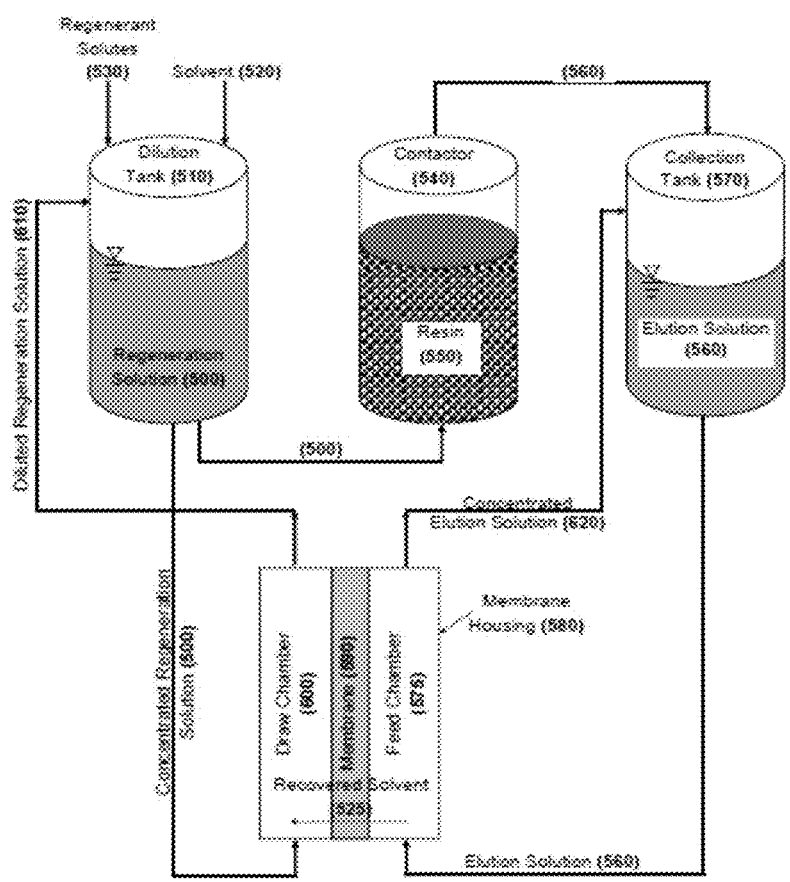
FIG. 4 shows the ion exchange regeneration process with integrated forward osmosis of the present invention.

FIG. 4 is a schematic of an ion exchange regeneration process that integrates forward osmosis for elution solution volume reduction and concentration. For an initial regeneration cycle, a regeneration solution 500 is initially formed in the dilution tank 510 by mixing solvent 520 with regenerant solutes 530. The regeneration solution 500 is formed with a desired concentration and volume and is passed through a contactor 540 containing resin 550 producing an elution solution 560 that discharges to a collection tank 570. After the regeneration cycle is complete and all the elution solution 560 is collected in the collection tank 570, the volume reduction process begins. In the dilution tank 510, a regeneration solution 500 containing regenerant solutes and solvent 520 is formed, where the concentration is greater than the desired concentration for the resin 550 regeneration process and has a higher osmotic pressure than the osmotic pressure of the elution solution 560. A membrane housing 580 contains a semi-permeable membrane 590, wherein the semi-permeable membrane separates a feed chamber 575 from a draw chamber 600. The elution solution 560 passes through the feed chamber 575, is exposed to one side of the membrane 590 and is recirculated back to the collection tank 570. The regeneration solution 500 passes through the draw chamber 600 and is exposed to the opposing side of the membrane 590 as the elution solution 560. Here, the regeneration solution 500 acts as the draw solution, and the elution solution 560 acts as the feed solution for forward osmosis. Recovered solvent 525 permeates across the semi-permeable membrane 590 from the elution solution 560 to the regeneration solution 500 forming a diluted regeneration solution 610 and a concentrated elution solution 620. The diluted regeneration solution 610 is recycled back to the dilution tank 510 forming a regeneration solution 500 of lower osmotic pressure than the initial osmotic pressure. The concentrated elution solution 620 is recycled to the collection tank 570 forming an elution solution 560 of higher osmotic pressure than the initial osmotic pressure. The elution solution 560 and regeneration solution 500 continue to recirculate through the housing 580 and membrane 590 until either the regeneration solution 500 is diluted to desired concentration of solutes or volume for the next regeneration cycle or the osmotic pressure of the regeneration solution 500 and elution solution 560 are equal, at which point recovered solvent 525 flux across the membrane 590 ceases. This method reduces the volume and increases the solute concentration of the elution solution 560 and recovers solvent 520 from the elution solution 560 in the regeneration solution 500, thus reducing the volume of solvent 520 required for future regeneration cycles.

Figure 5:
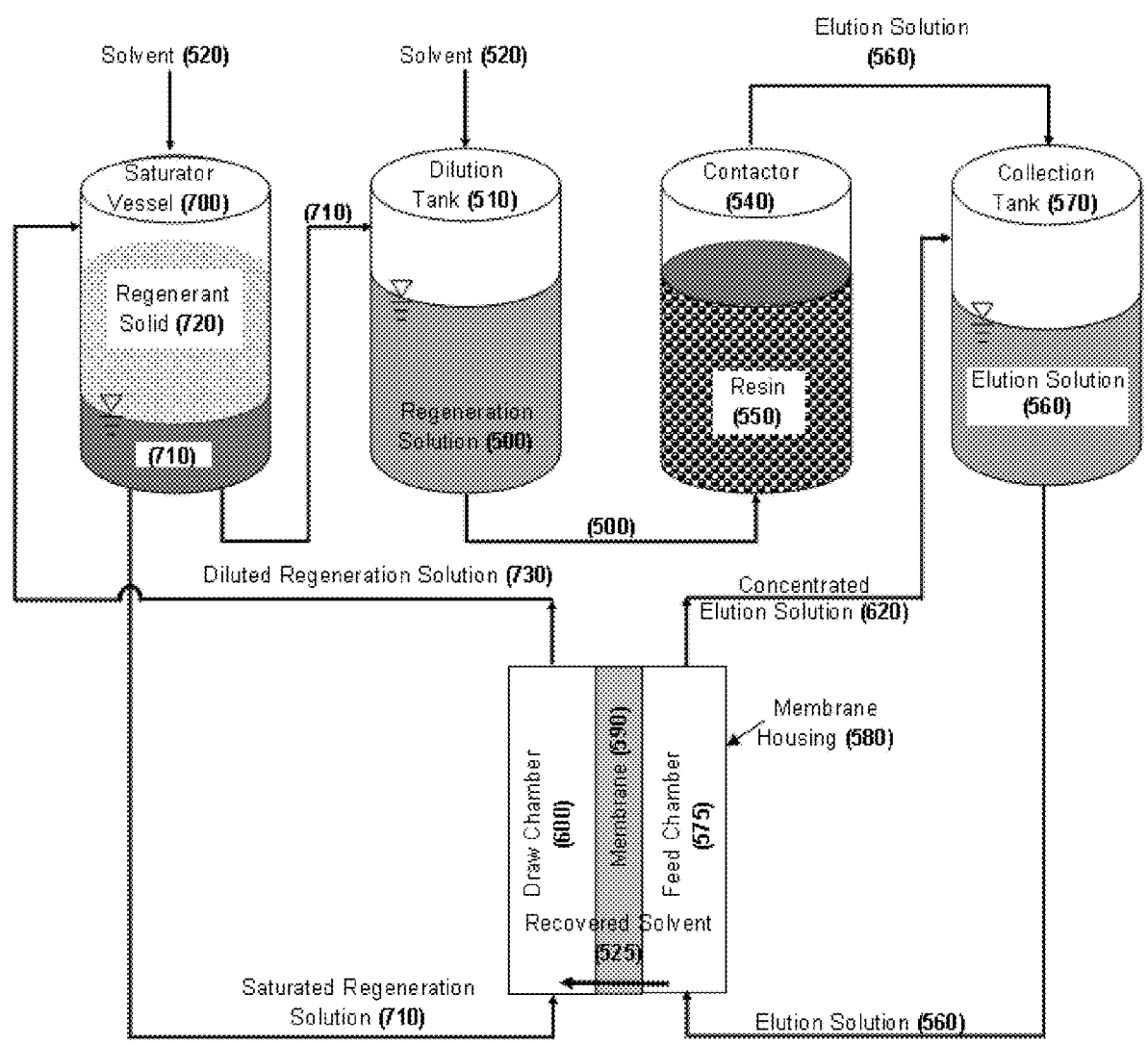
FIG. 5 shows the ion exchange regeneration process with integrated forward osmosis with salt saturator configuration of the present invention.

In another embodiment shown in FIG. 5, a saturator vessel 700 is used to form a saturated regeneration solution 710 containing solvent 520 and the regenerant solid 720. In the first regeneration cycle, the saturated regeneration solution 710 is mixed with solvent 520 in the dilution tank 510 to dilute the saturated regeneration solution 710 to the desired concentration and volume. The regeneration solution 500 is passed through the contactor 540 with resin 550 to form the elution solution 560. The saturated regeneration solution 710 has a higher osmotic pressure than the elution solution 560. To reduce the volume of the elution solution 560, the elution solution 560 passes through the feed chamber 575 in the membrane housing 580, allowing recovered solvent 525 to pass through the membrane 590 as previously described. In this embodiment, the saturated regeneration solution 710 circulates through the draw chamber 600, wherein recovered solvent 525 permeates across the membrane 590 from the elution solution 560 to form a diluted regeneration solution 730. The diluted regeneration solution 730 passes back to the saturator vessel 700, where additional regenerant solid 720 dissolves, reforming the saturated regeneration solution 710. In this embodiment, a saturated regeneration solution 710 with constant osmotic pressure is used as a draw solution in the volume reduction process. The volume reduction process is terminated when the system reaches osmotic equilibrium or another operational set point has been achieved. For future regeneration cycles, a reduced volume or no additional volume of solvent 520 to the saturator vessel 700 would be required as recovered solvent 525 from the elution solution 560 would be used.

In another embodiment, the dilution tank 510 in FIG. 5 can be eliminated, and the saturated regeneration solution 710 is mixed with solvent 520 using an in-line mixer forming the regeneration solution 500 directly in a pipe passing solution to the contactor 540.

Figure 6:
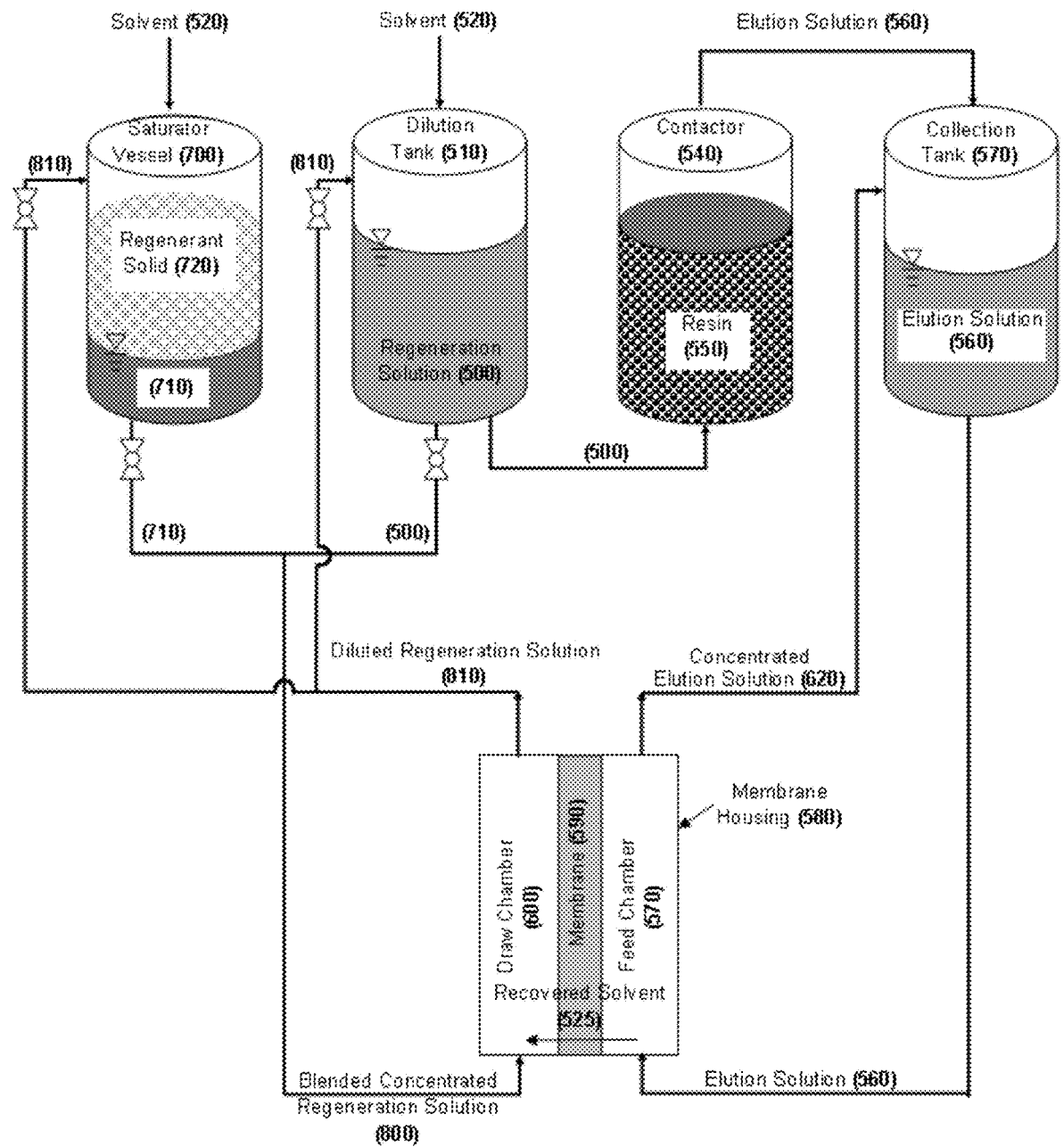
FIG. 6 shows the ion exchange regeneration process with integrated forward osmosis and variable draw solution configuration of the present invention.

In another embodiment, a solution with variable osmotic pressure is used as the draw solution as shown in FIG. 6. Instead of using a saturated regeneration solution 710, a blended concentrated regeneration solution 800 with an osmotic pressure greater than the elution solution 560 may be used. The blended concentrated regeneration solution 800 may be composed of saturated regeneration solution 710, regeneration solution 500 with an osmotic pressure less than the saturated regeneration solution 710, or a mixture of the saturated regeneration solution 710 and regeneration solution 500. The diluted regeneration solution 810 that exits the draw chamber 600 of the housing 580 with the membrane 590 may be recycled back to the saturator vessel 700 or dilution tank 510. When recycled back to the saturator vessel 700, excess regenerant solid 720 dissolves reforming the saturated regeneration solution 710. When the diluted regeneration solution 810 is recycled to the dilution tank 510, the concentration and osmotic pressure are less than the saturated regeneration solution 710. Once the volume reduction of the elution solution 560 is complete, the regeneration solution 500 is passed through the contactor 540 to regenerate the resin 550 producing a new elution solution 560. This embodiment allows for the osmotic pressure of solution in the draw chamber 600 to be controlled using blending to achieve desired water flux rates or to produce a regeneration solution 500 with the desired concentration at the end of the elution solution 560 volume reduction process.

Figure 7:
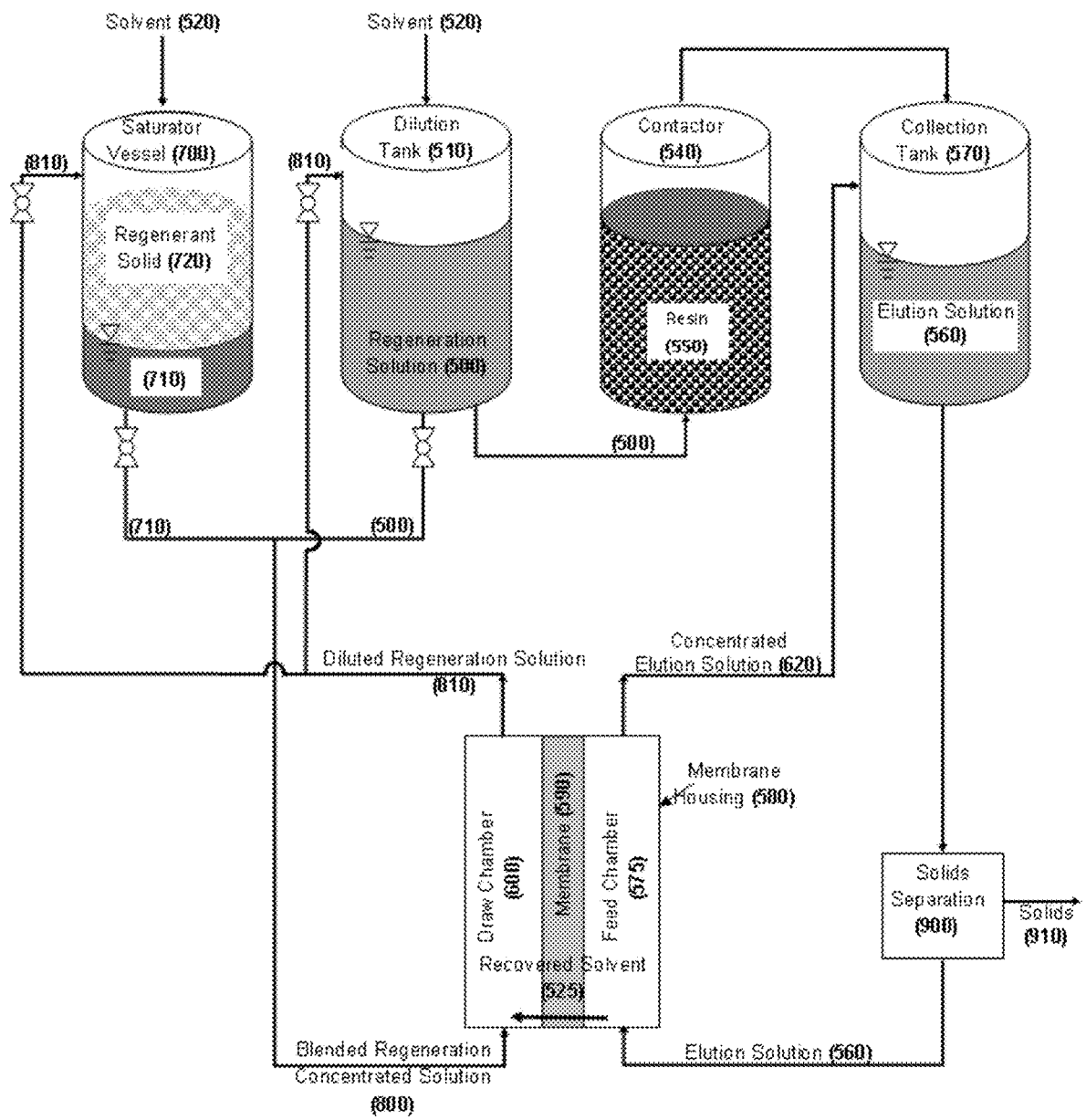
FIG. 7 shows the ion exchange regeneration process with integrated forward osmosis and solids separation of the present invention.

In another embodiment, a solids separation process 900 is added to the embodiment in FIG. 6 to remove solids formed in the elution solution 560 before entering the housing 580 with the membrane 590 as shown in FIG. 7. The solids separation process 900 includes any process that separates solids from a liquid solution, and a non-exclusive list includes a crystallizer, cyclone, media filter, belt press, pressure filter, membrane, solids separator, clarifier or any combination thereof. In this embodiment, the elution solution 560 becomes concentrated such that one or more solutes are saturated and form a precipitate. The solids 910 are removed in the solids separator 900 before the elution solution 560 enters the housing 580.

Examples: The examples presented herein represent embodiments of the present invention. Two elution solutions were concentrated from ion exchange processes designed to remove either hexavalent chromium or nitrate from a drinking water source. The present invention would be applicable for any ion exchange process where the resin is regenerated, and volume reduction, concentration or solvent recovery from the elution solution is desirable.

In each example of the invention, elution solution reduction was conducted using flat sheet cellulose triacetate (CTA) forward osmosis membranes (Fluid Technology Solutions (FTSH$_2$O) Albany, Oreg.), and new membrane swatches were used for each experiment. All experiments were conducted in a Sterlitech SEPA cell with a membrane area of 0.014 m$^2$. The channel width and depth were measured using digital calipers and found to be 95 mm wide and 0.83 mm deep giving a cross-sectional area of 78.9 mm$^2$. Experiments were run with the membrane oriented in forward osmosis mode having the active layer facing the elution solution with the co-current flow at a cross flow velocity of 0.17 m/s without spacers. The temperature was maintained in both the elution and saturated/concentrated solutions at 25° C.±1° C. in the present invention.

Example 1: This embodiment of the present invention reduced the volume and recovered water from the elution solution 560, as shown in FIG. 6, generated from a pilot-scale strong base anion exchange process that removed hexavalent chromium from groundwater. The initial composition of the elution solution is summarized in Table 1.

TABLE 1

Initial composition of chromium elution solution

| Analyte | Concentration (mg/L) |
|---|---|
| Sodium | 23,000 |
| Potassium | 6,600 |
| Chloride | 15,000 |
| Sulfate | 35,000 |
| Nitrate | 730 |
| Alkalinity (as CaCO$_3$) | 2,400 |
| Chromium | 320 |
| Vanadium | 34 |
| Arsenic | 3.6 |
| Selenium | 3.4 |
| Uranium | 1.8 |

The contactor 540 contained Purolite A600E resin 550 and was regenerated using a 2 N sodium chloride (NaCl) regeneration solution 500. The batch concentration process started with 1.35 L of elution solution 560 and 0.88 L of saturated NaCl as the saturated regeneration solution 710 that was used as a draw solution and water was used as the solvent 520, summarized in Table 2. This embodiment passed an initial volume of saturated NaCl to the dilution tank 510, and the regeneration solution 500 in the dilution tank 510 was fed to the housing 580 as the blended concentrated regeneration solution 800 as shown in FIG. 6. The diluted regeneration solution 810 was recycled to the dilution tank 510. At the end of the test, the elution solution 560 volume in the collection tank 570 decreased as recovered solvent 525 permeated across the membrane 590 forming the diluted regeneration solution 810 shown in FIG. 6. Since the diluted regeneration solution 810 did not return to the saturator vessel 700 and was recycled to the dilution tank 510, the osmotic pressure and conductivity of the regeneration solution 500 decreased with increased recovered solvent 525 as shown in Table 2. An elution solution 560 mass reduction of approximately 79% induced visual precipitation of solids. The run was stopped at 85% mass reduction of elution solution 560 when a sudden loss of membrane integrity was observed, presumably due to solid precipitate formation compromising the membrane surface structure. At the end of the batch process, the final volume of the now concentrated elution solution 560 was 0.17 L and the regeneration solution 500 volume was 1.92 L. Recovered solvent 525 flux across the membrane 590 decreased from 14 L/m$^2$/hr at 2% solvent recovery to less than 1 L/m$^2$/hr at 75% solvent recovery. The elution solution 560 volume was reduced by 85%±4% on a mass basis and 88%±4% on a volume basis, demonstrating that this invention can reduce disposal costs associated with ion exchange processes by decreasing the volume that requires disposal.

TABLE 2

Volume reduction and solution bulk characteristics for Example 1

| Stream | Stage | Volume (L) | Specific Gravity | Conductivity (mS/cm) | Waste Reduction Mass | Waste Reduction Volume |
|---|---|---|---|---|---|---|
| Elution | Initial | 1.35 | 1.06 | 98 | 85% ± 4% | 88 ± 4% |
| Solution | Final | 0.17 | 1.31 | 168 | | |
| Regeneration | Initial | 0.88 | 1.20 | 242 | | |
| Solution | Final | 1.92 | 1.20 | 200 | | |

Figure 8:
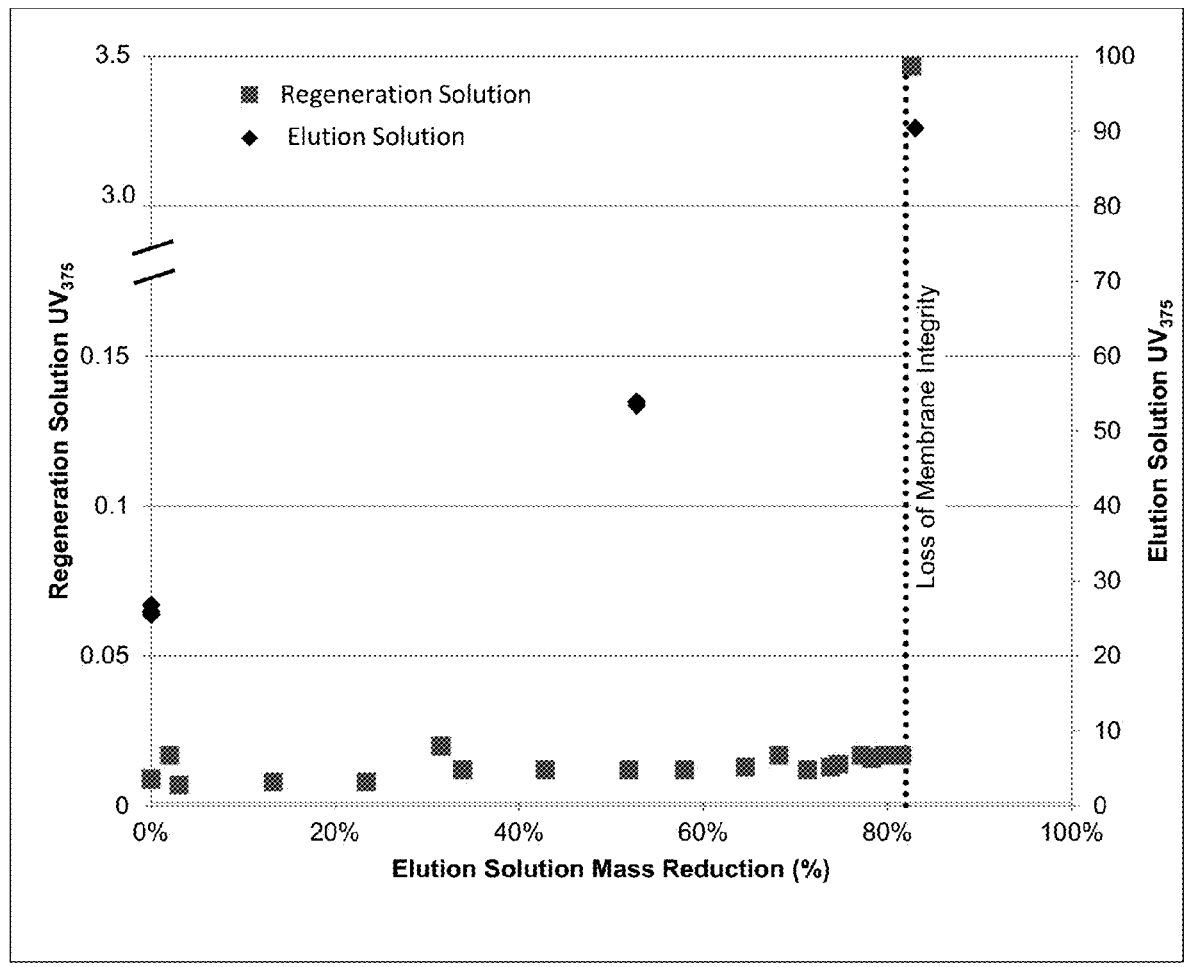
FIG. 8 is a graph showing the UV375 absorbance of the elution and regeneration solution of the present invention.

Hexavalent chromium concentrations in the elution solution 560 and regeneration solution 500 were monitored by measuring absorbance at 375 nanometers ($UV_{375}$). Samples were diluted prior to analysis and scaled according to Beer-Lambert Law. FIG. 8 shows that UV375 in the regeneration solution 500 was low (<0.02 AU, <0.23 mg/L) up to 82% recovery, demonstrating good rejection of chromium by the membrane 590. UV375 of the elution solution 560 increased from 25 up to 90 AU throughout the concentration process.

Concentrations of the major elements and anions were measured for the initial and final solutions as shown in Table 3. For the elution solution 560, a sample collected at 76% recovery was analyzed as a final sample. The results show that the membrane 590 exhibited a high rejection of solutes, which is favorable to concentrating the elution solution 560 by extracting recovered solvent 525, water in this case, for the next regeneration cycle. At the start of the run, most solutes other than sodium and chloride in the regeneration solution were below the detection limit. The presence of sulfate may be due to an impurity in the regenerant solid 720.

Rejection of all solutes was high across the membrane 590 demonstrating that the present invention can preferentially allow for recovered solvent 525 to pass the membrane 590 without solutes from the elution solution 560. Chromium concentrations in elution solution 560 increased from about 320 mg/L to 1900 mg/L during the volume reduction process. At 76% recovery, the estimated chromium concentration in the regeneration solution 500 was only 0.2 mg/L based on absorbance and below the detection limit of the inductively coupled plasma-mass spectrometry method. Using the absorbance data, chromium rejection across the membrane 590 was determined to be greater than 99.9%. Nitrate rejection was greater than 97% during the volume reduction process.

TABLE 3

Water quality in the elution and regeneration solutions for Example 1

| | | | Concentration (mg/L) | | | | | | | |
|---|---|---|---|---|---|---|---|---|---|---|
| Stream | Stage | Recovery | Cr | V | U | As | Se | Mo | NO₃ | SO₄ |
| Elution | Initial | 0% | 320 | 34 | 1.7 | 3.6 | 3.4 | 90 | 730 | 35,000 |
| Solution | Final | 85% | 1900 | 230 | 11 | 21 | 19 | 570 | 3600 | 86,000 |
| Regeneration | Initial | 0% | <0.5 | 1.8 | <0.0001 | 1.0 | <0.9 | <0.1 | <50 | 95 |
| Solution | Final | 76% | <0.9 | 1.9 | 0.002 | 0.9 | <1.7 | 1.8 | 95 | 653 |

In this embodiment of the present invention, the volume reduction process continued until the elution solution 560 became saturated with respect to at least one salt. Visible precipitation of solids was observed starting at about 75% recovery, and solids were observed clogging the suction side of the pump in the collection tank 570. Chemical analysis of the precipitate using a scanning electron microscope with energy dispersive spectroscopy found the salts were composed primarily of sulfate with one of three cations: sodium, potassium or calcium. Despite the yellow color of the solids, trace concentrations of chromium were observed solely in 2 of 13 spots analyzed by energy dispersive spectroscopy.

At 84% solvent recovery, water flux instantaneously increased from 0.2 L/m²/hr to 4.4 L/m²/hr, and membrane rejection decreased. Simultaneously, regeneration solution 500 pH and UV375 increased. These results demonstrate that the present embodiment is effective when the elution solution 560 is concentrated but does not form solid precipitates which will compromise the membrane integrity. Process improvement is demonstrated in another embodiment with the use of a nitrate waste brine with a bag filter that alleviates this issue of precipitation and membrane abrasion through filtration.

In Example 2, this embodiment of the present invention reduced the volume and recovered water from the elution solution 560 with a composition representative of an ion exchange process removing nitrate from groundwater as shown in FIG. 5. The elution solution 560 was a synthetic solution modeling major water chemistry solutes based on published values from WO2015031112. The composition is summarized in Table 4.

TABLE 4

Initial composition of the elution solution used in Examples 2 and 3

| Analyte | Concentration (mg/L) |
|---|---|
| Sodium | 40,000 |
| Chloride | 46,000 |
| Nitrate | 10,000 |
| Sulfate | 9,000 |
| Bicarbonate | 11,000 |

This embodiment started with 1.94 L of elution solution 560 and 0.98 L of saturated sodium chloride 710, with water as the solvent 520. The saturator vessel 700 had microfiber bags filled with solid NaCl as the regenerant solid 720. In this embodiment, saturated solution 710 from the salt saturator, which is the saturator vessel 700 was fed to the draw chamber 600 of the housing 580 with the membrane 590, and the diluted regeneration solution 730 was recycled to the saturator vessel 700 to reform the saturated regeneration solution 710. The concentration and osmotic pressure of the saturated regeneration solution 710, acting as the draw solution, was constant through the volume reduction process.

Figure 10:
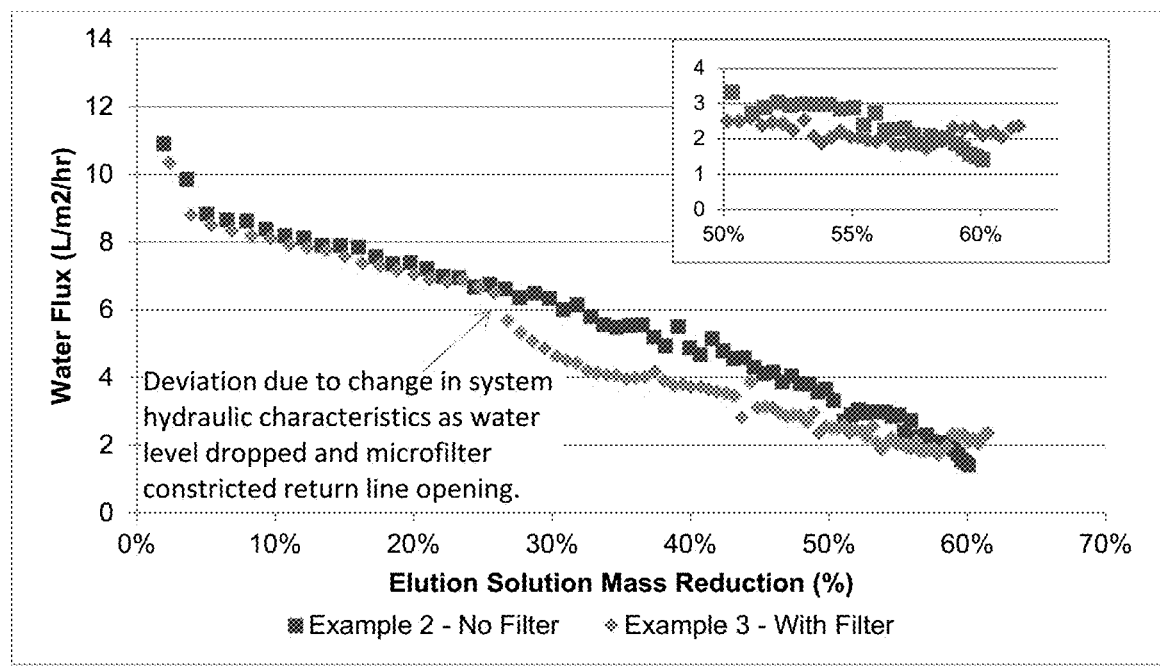
FIG. 10 shows the water flux decrease as a function of elution solution mass reduction of the present invention.

The volume and mass of the elution solution 560 were reduced by 66%±3% and 62%±2%, respectively, as summarized in Table 5. At the end of the volume reduction process, the volume elution solution 560 was 0.66 L, and volume of the saturated regeneration solution 710 was 2.3 L. Flux during volume reduction and solvent recovery process decreased from an initial rate of 11 L/m$^2$/hr to a final rate of 1 L/m$^2$/hr at which point the process was stopped as shown in FIG. 10. A visible precipitate started accumulating near the pump suction intake in the collection tank 570 at approximately 55-60% elution solution 560 mass reduction. The elution solution 560 conductivity increased from 112 mS/cm to 191 mS/cm as the elution solution 560 became concentrated. The pH of the elution solution 560 increased from 7.7 to 8.25 as the solution became more concentrated. Up to about 50% recovery, the pH of the saturated regeneration solution 710 was about 5.5, typical for sodium chloride solutions. However, the pH of the present invention measured at the end of the run (66% volume reduction) was 6.68.

TABLE 5

Volume reduction and solution bulk characteristics for Example 2

| Stream | Stage | Volume (L) | Specific Gravity | Conductivity (mS/cm) | Elution Solution Reduction Mass | Elution Solution Reduction Volume |
|---|---|---|---|---|---|---|
| Elution Solution | Initial | 1.94 | 1.07 | 112 | 62% ± 2% | 66% ± 2% |
| | Final | 0.66 | 1.20 | 191 | | |
| Saturated Solution | Initial | 0.98 | 1.18 | 237 | | |
| | Final | 2.2 | 1.18 | >250 | | |

Figure 9:
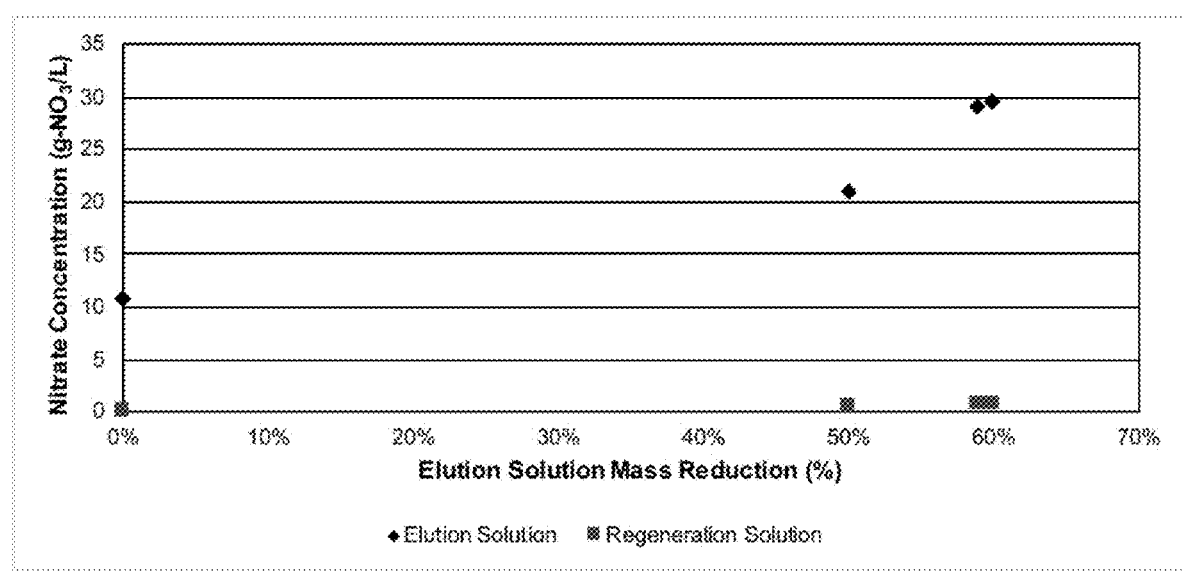
FIG. 9 is a graph showing nitrate concentration of the elution and regeneration solution of the present invention.

The membrane 590 exhibited high rejections of both nitrate and sulfate, demonstrating that the present invention recovered solvent 525 with minimal loss of solutes in the elution solution 560. Nitrate concentrations were measured at four different times during the batch concentration process using both UV absorbance at 220 nanometers and ion chromatography. FIG. 9 shows that the nitrate concentration in both the elution solution 560 and saturated regeneration solution 710 increased. The nitrate concentration in the elution solution 560 increased from 10.8 g-NO$_3$/L to 29.5 g-NO$_3$/L, as shown in Table 6. The membrane 590 exhibited a nitrate rejection of 97.7%±1.0%, and the final concentration in the saturated regeneration solution 710 never exceeded 0.7 g-NO$_3$/L. Compared to chloride on an equivalent basis, this nitrate concentration in the saturated regeneration solution 710 represents a 0.6% impurity for the next regeneration cycle, which is not expected to have adverse effects. Sulfate rejection was higher than nitrate at 99.7%±0.2%, which is expected since sulfate has greater molecular weight and charge (−2) compared to nitrate (−1).

TABLE 6

Nitrate and sulfate concentrations for Example 2

| Stream | Recovery | Concentration (mg/L) NO3 | Concentration (mg/L) SO4 | Average Rejection NO$_3$ | Average Rejection SO$_4$ |
|---|---|---|---|---|---|
| Elution Solution | 0% | 10,800 | 8,400 | 97.7% ± 1.0% | 99.7% ± 0.2% |
| | 50% | 21,000 | 19,000 | | |
| | 59% | 29,000 | 25,000 | | |
| | 60% | 29,500 | 25,000 | | |
| Saturated Solution | 0% | 68 | 53 | | |
| | 50% | 597 | 22 | | |
| | 59% | 672 | 22 | | |
| | 60% | 686 | 68 | | |

In Example 3, the volume reduction and solvent recovery process of FIG. 7 was modified by incorporating a bag microfilter as a solids separation process 900 on the concentrated elution solution 620 return line from the membrane housing 580 to the collection tank 570, such that the concentrated elution solution 620 passes through the solids separation process 900 before returning to the collection tank 570. Another embodiment, shown in FIG. 7, places the solids separation process 900 between the collection tank 570 and the housing 580, such that the elution solution 560 passes through the solids separation process 900. The purpose of this modification was to separate solid precipitates and prevent slurry circulation. While filtration was used in this embodiment, other previously mentioned separation methods and the combination of separation methods would be applicable (e.g., cyclone, crystallizer, belt press).

Example 2 was repeated with an added microfilter bag in place for the synthetic nitrate process elution solution 560 with the composition shown in Table 4. Flux as a function of elution solution 560 solvent recovery at the beginning of the run was the same as Example 2 without the bag microfilter (FIG. 10). The flux deviated around 25% with the added solids separation process 900 due to a change in the process hydraulics resulting from the addition of the bag microfilter. As the water level in the collection tank 570 dropped, the bag microfilter provided incrementally more resistance to flow, which decreased the cross-flow velocity in the feed chamber 575. The elution solution 560 and blended regeneration concentrated solution 800 conductivity as a function of elution solution 560 mass reduction was nearly identical between Example 2 in FIG. 5 and Example 3 in FIG. 7. Flux differences cannot be attributed to compositional differences between the examples. With the optimization of flow between the two operation modes (i.e., with and without the solids separation process (900)), consistent flux between the two modes would be expected.

The addition of the filter improved process performance at the end of the concentration and recovery process as shown in FIG. 10. Above 55% elution solution 560 mass reduction when solids precipitation was previously observed, flux without the microfilter (Example 2) decreased from 3 L/m$^2$/hr to 1.4 L/m$^2$/hr. With the addition of the microfilter (Example 3), flux was relatively stable between 1.8 L/m$^2$/hr and 2.2 L/m$^2$/hr, which allowed for continued operation at higher recoveries. The process for Example 3 was stopped when the elution solution 560 conductivity matched the conditions of Example 2, but additional recovery could be possible based on the flux.

Figure 11:
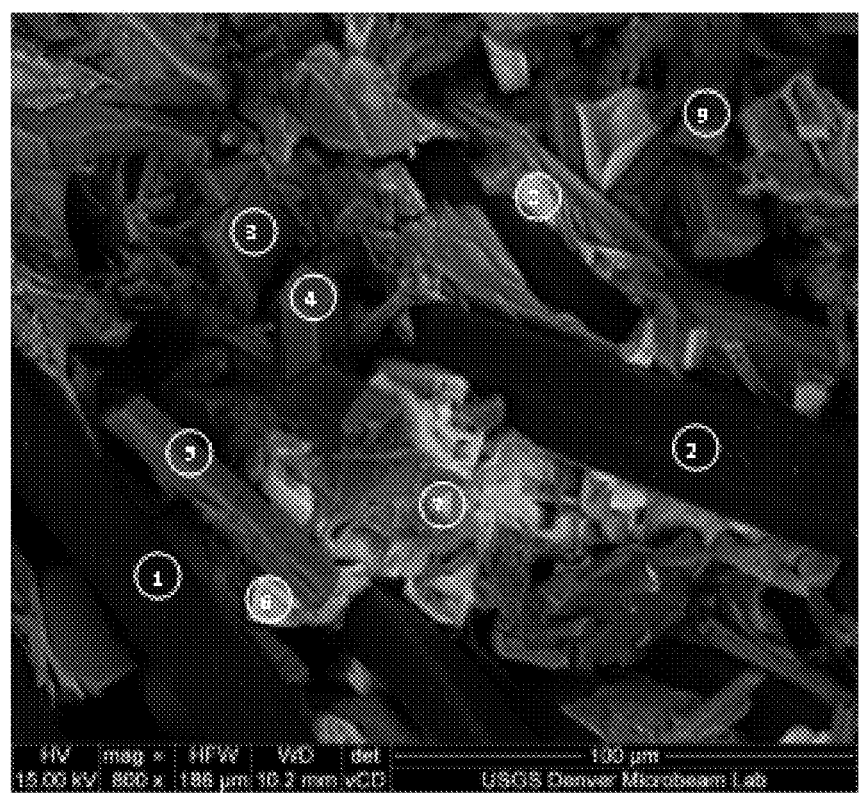
FIG. 11 shows the scanning electron microscope image with interrogation spots for energy dispersive spectroscopy for filtered material of the present invention.

The bag filter was effective at managing solids formation in the elution solution 560 solution, which is a goal of the present invention. No visible solids accumulated at the pump suction intake. No solids accumulation was observed in the process lines, collection tank 570 or housing 580 as observed in Examples 1 and 2. Nearly all precipitate formed was immobilized by the bag filter solids separation process 900, further demonstrating an effective process modification of the present invention. The bag microfilter solids separation process 900 not only provided a physical mechanism for removing the solids but also a favorable substrate for precipitate nucleation and deposition, as solids formed in the interstitial space between organic filter fibers. The bag filter solids separate process 900 may include a dry bag microfilter. All of the solids attached to the fabric substrate; no loose solids were collected in the bottom of the bag microfilter solids separation process 900. A scanning electron microscope image for the filter section is shown in FIG. 11, and the energy dispersive spectroscopy analysis for FIG. 11 is shown in Table 7. Weighing the dry bag microfilter 900 before and after run found that 16.8 grams of solids had collected on the bag, representing about 7% of the initial total dissolved solids in the elution solution 560.

TABLE 7

Energy dispersive spectroscopy analysis for solids collected on the filter from Example 3. Spots refer to interrogation zones in FIG. 11

| | Atomic % | | | | | Potential Solids |
|---|---|---|---|---|---|---|
| Spot | Na | S | O | Cl | C | Present |
| 1 | — | — | 7.98 | 2.06 | 93.08 | Organic filter |
| 2 | — | — | 8.86 | 0.75 | 90.59 | Organic filter |
| 3 | 39.91 | 4.26 | 55.83 | — | — | Na$_2$SO$_4$ |
| 4 | 28.45 | 0.52 | 49.58 | 0.48 | 20.97 | Na$_2$SO$_4$, NaCl, Na$_2$CO$_3$ |
| 5 | 23.70 | — | 48.89 | — | 27.41 | Na$_2$CO$_3$ |
| 6 | 52.51 | — | 6.77 | 40.72 | — | NaCl |
| 7 | 42.02 | — | 5.56 | 52.42 | — | NaCl |
| 8 | 51.20 | 0.35 | 1.59 | 48.87 | — | NaCl, Na$_2$SO$_4$ |
| 9 | 25.38 | — | 50.71 | — | 23.91 | Na$_2$CO$_3$ |

In Example 4, another embodiment of the present invention was conducted to determine how the experimental results compare to theoretical process predictions for Examples 2 and 3. All modeling was conducted using OLI Stream Analyzer computer software.

Figure 12:
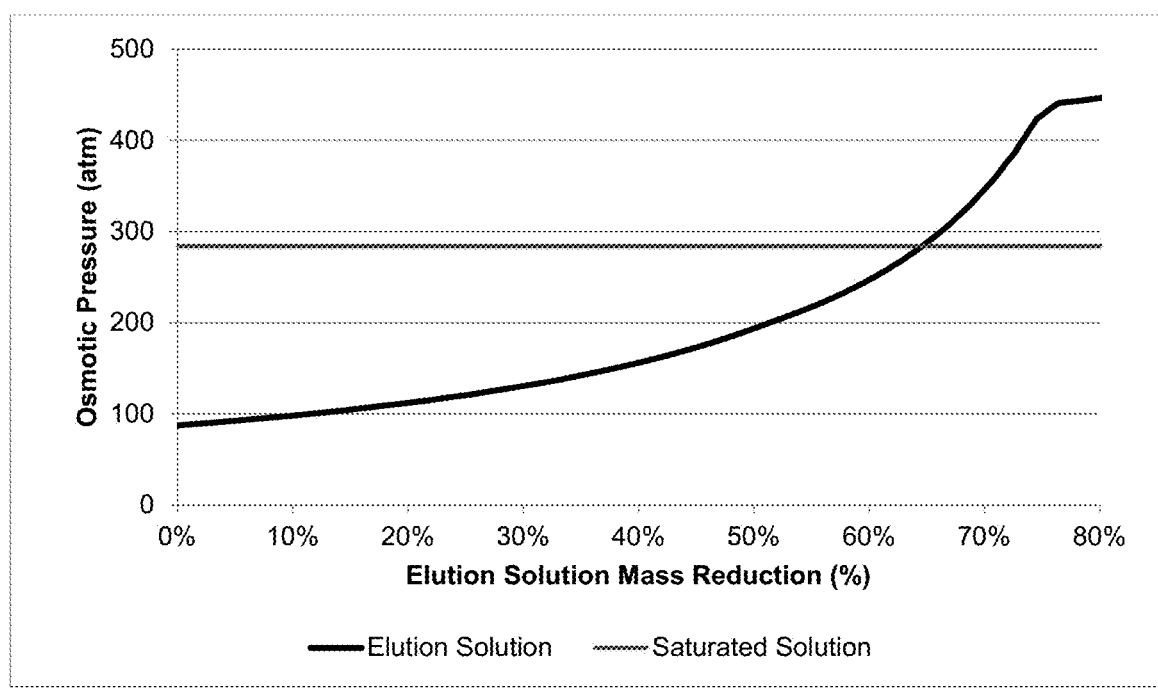
FIG. 12 shows the osmotic pressure (theoretical) on each side of the membrane before, at 65% recovery (equilibrium), and after 65% recovery of the present invention.

Permeation of recovered solvent 525 from the elution solution 560 to saturated regeneration solution 710, as shown in FIG. 5, requires a difference in osmotic pressure between the two solutions. Based on a thermodynamic model (OLI Stream Analyzer), the NaCl saturated regenerated solution 710 had an osmotic pressure of about 280 atm, shown as a horizontal line in FIG. 12. Assuming complete rejection of solutes by the membrane 590, the osmotic pressure of the elution solution 560 increased as a function of increased recovered solvent 525 where water is permeating from elution solution 560 to saturated regeneration solution 710. FIG. 12 shows that the osmotic pressure on each side of the membrane 590 is equal at 65% recovery, which represents the maximum achievable recovery for this specific brine tested. Therefore, Example 2, which yielded an elution solution 560 mass reduction of 62%, just below the maximum theoretical recovery obtained by the thermodynamic model. These results demonstrate that the experimental process nearly maximized the reduction of the elution solution 560 compared to theoretical limitations.

Figure 13:
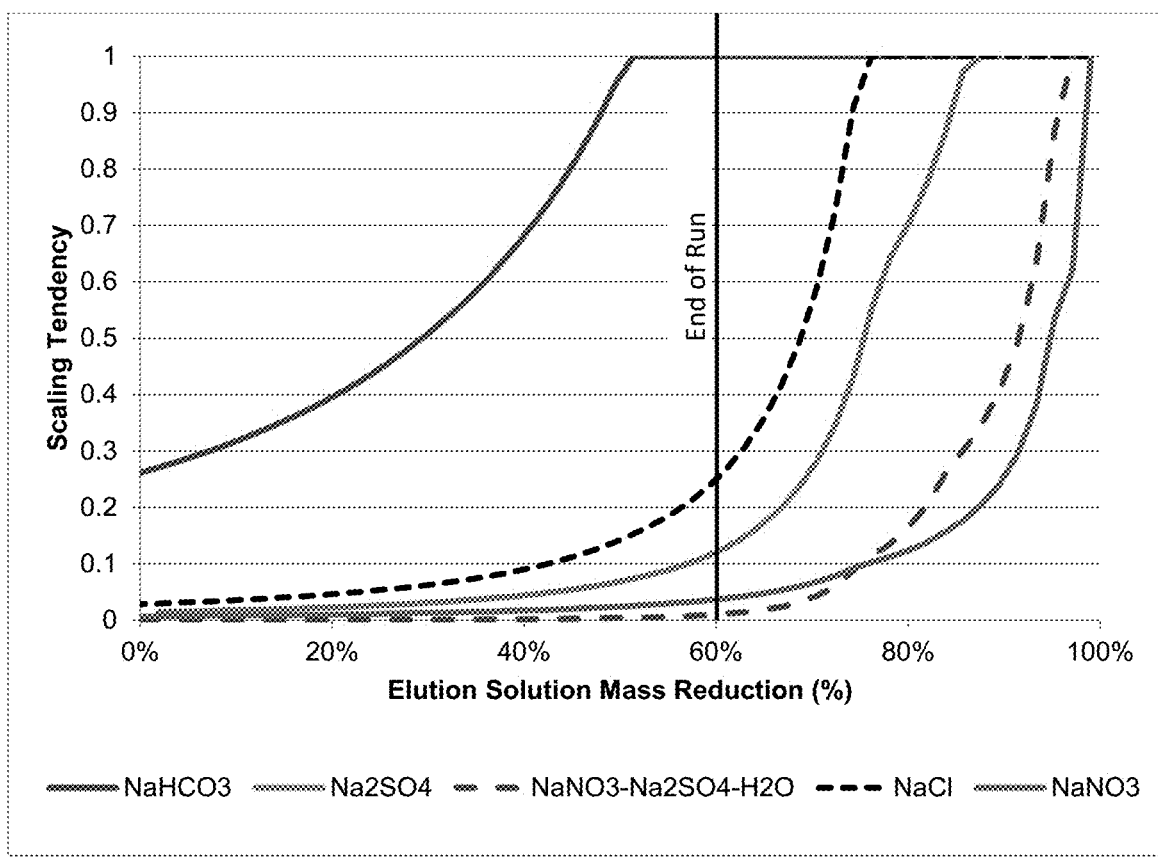
FIG. 13 shows the scaling tendencies (theoretical) of different solid precipitates as a function of elution solution mass reduction of the present invention.

Modeling was used to evaluate the formation of precipitates during the volume reduction and solvent recovery process of this embodiment. FIG. 13 shows the scaling tendencies of different solid precipitates as a function of elution solution 560 mass reduction, which assumed complete solute rejection by the membrane 590. A scaling tendency of 1 indicates that the solution is saturated with respect to a particularly solid and precipitation will occur. FIG. 13 shows the theoretical scaling tendency of different solids in feed solution for nitrate process elution solution 560 reduction process. The vertical line indicates the end conditions of the experimental run. FIG. 13 shows that sodium bicarbonate (NaHCO$_3$) reached saturation at a mass reduction of about 50%. Accumulated solids were visible at about 55% mass reduction comparing experimental observations to the model prediction of 50%.

Comparing the results of Examples 3 and 4, solids that were not expected to precipitate based on thermodynamic equilibrium in Example 4 were observed in Example 3. Although FIG. 13 predicted little to no NaCl or Na$_2$SO$_4$ precipitation, the presence of both solids was detected using energy dispersive spectroscopy as shown in Table 7. The initial precipitation of $NaHCO_3$ on the microfilter may have provided favorable conditions for additional precipitates to form through co-precipitation or contact nucleation.

The present invention can be applied where an ion exchange resin is regenerated using a solution and reduction in the elution solution is desirable. Other fields outside of water treatment where this invention is applicable include industrial waste treatment; food and beverage processing (e.g., sugar processing); metals processing; pharmaceutical manufacturing; medical/therapeutic applications (e.g., dialysis, drug delivery); chemical processing; mining; and metallurgy.

The embodiments presented herein use sodium chloride (NaCl) as the regenerant solid and in the regeneration solution. Other dissolved solutes can be used depending on the configuration and treatment objectives of an ion exchange process. Any compound dissolved in water that exerts an osmotic pressure and is used to regenerate ion exchange resin falls within the scope of this invention. Other regeneration compounds that fall under the scope of the present invention may include: $NaCl$, $KCl$, $LiCl$, $CaCl_2$, $MgCl_2$; $NaHCO_3$, $KHCO_3$, $LiHCO_3$, $Ca(HCO_3)_2$, $Mg(HCO_3)_2$; $Na_2CO_3$, $K_2NaCO_3$, $Li_2CO_3$, $CaCO_3$, $MgCO_3$; $Na_2SO_4$, $K_2SO_4$, $Li_2SO_4$, $CaSO_4$, $MgSO_4$; $Ca(OH)_2$, $Mg(OH)_2$, $NaOH$, $KOH$; and $HCl$.

While the invention has been particularly shown and described with reference to preferred embodiments, it will be understood by those skilled in the art that various changes in form and detail may be made therein without departing from the spirit and scope of the invention.

The invention claimed is:

1. A forward osmosis system for concentrating and recovering solvent from an elution solution via forward osmosis, the system comprising:
 a first vessel configured to contain an elution solution;
 a contactor vessel comprising an ion exchange resin, the contactor vessel in fluid communication with the first vessel;
 a second vessel configured to contain a saturated regeneration solution, the second vessel in fluid communication with the contactor vessel; and
 a membrane housing configured for forward osmosis of the elution solution, the membrane housing comprising a feed chamber, a draw chamber, and a semi-permeable membrane separating the feed chamber and the draw chamber,
 wherein the first vessel is in fluid communication with the feed chamber via a first flow path configured to circulate the elution solution from the first vessel through the feed chamber, along a side of the semi-permeable membrane, and back to the first vessel, and
 further wherein the second vessel is in fluid communication with the draw chamber via a second flow path configured to circulate the saturated regeneration solution from the second vessel through the draw chamber, along an opposing side of the semi-permeable membrane, and back to the second vessel.

2. The forward osmosis system of claim 1, the system further comprising a third vessel configured to contain a regeneration solution, wherein the third vessel is in fluid communication with the second vessel, and
 further wherein the third vessel is in fluid communication with the contactor vessel.

3. The forward osmosis system of claim 1, the system further comprising a third vessel configured to contain a regeneration solution, wherein the third vessel is in fluid communication with the draw chamber via the second flow path,
 wherein the second flow path is further configured to circulate the regeneration solution from the third vessel through the draw chamber, along the opposing side of the semi-permeable membrane, and back to the third vessel, and
 further wherein the third vessel is in fluid communication with the contactor vessel.

4. The forward osmosis system of claim 1, the system further comprising a solids separation unit configured to separate solids from liquids in the elution solution, the solids separation unit positioned within the first flow path configured to circulate the elution solution.

5. The forward osmosis system of claim 2, wherein the first vessel and the contactor vessel are in fluid communication via a third flow path configured to pass solution from the contactor vessel to the first vessel,
 further wherein the second vessel and the third vessel are in fluid communication via a fourth flow path configured to pass the saturated regeneration solution from the second vessel to the third vessel, and
 further wherein the third vessel and the contactor vessel are in fluid communication via a fifth flow path configured to pass the regeneration solution from the third vessel to the contactor vessel.

6. The forward osmosis system of claim 3, wherein the first vessel and the contactor vessel are in fluid communication via a third flow path configured to pass solution from the contactor vessel to the first vessel,
 further wherein the third vessel and the contactor vessel are in fluid communication via a fourth flow path configured to pass the regeneration solution from the third vessel to the contactor vessel.

7. The forward osmosis system of claim 6, the system further comprising a solids separation unit configured to separate solids from liquids in the elution solution, the solids separation unit positioned within the first flow path configured to circulate the elution solution.

8. The forward osmosis system of claim 7, wherein the solids separation unit is positioned within the first flow path before the membrane housing.

9. The forward osmosis system of claim 7, wherein the solids separation unit is positioned within the first flow path after the membrane housing.

10. A process for concentrating and recovering solvent from an elution solution via forward osmosis using the system of claim 1, the process comprising:
 forming the saturated regeneration solution;
 forming a regeneration solution from the saturated regeneration solution;
 forming the elution solution by passing the regeneration solution through the ion exchange resin of the contactor vessel, the elution solution having an osmotic pressure that is less than an osmotic pressure of the saturated regeneration solution; and
 circulating the elution solution via the first flow path and circulating the saturated regeneration solution via the second flow path, wherein solvent from the elution solution permeates across the semi-permeable membrane into the saturated regeneration solution.

11. The process of claim 10, wherein permeation of solvent from the elution solution across the semi-permeable membrane does not comprise use of hydraulic pressure.

12. A process for concentrating and recovering solvent from an elution solution via forward osmosis using the system of claim 3, the process comprising:
- forming the saturated regeneration solution;
- forming the regeneration solution from the saturated regeneration solution;
- forming the elution solution by passing the regeneration solution through the ion exchange resin of the contactor vessel, the elution solution having an osmotic pressure that is less than an osmotic pressure of the saturated regeneration solution, the regeneration solution, or a blend of the saturated regeneration solution and the regeneration solution; and
- circulating the elution solution via the first flow path and circulating the saturated regeneration solution, the regeneration solution, or the blend of the saturated regeneration solution and the regeneration solution via the second flow path, wherein solvent from the elution solution permeates across the semi-permeable membrane into the saturated regeneration solution, the regeneration solution, or the blend of the saturated regeneration solution and the regeneration solution.

13. The process of claim 12, wherein permeation of solvent from the elution solution across the semi-permeable membrane does not comprise use of hydraulic pressure.

\* \* \* \* \*